W. L. SCHELLENBACH.
LATHE.
APPLICATION FILED MAR. 4, 1916.
1,196,593.
Patented Aug. 29, 1916.
7 SHEETS—SHEET 1.
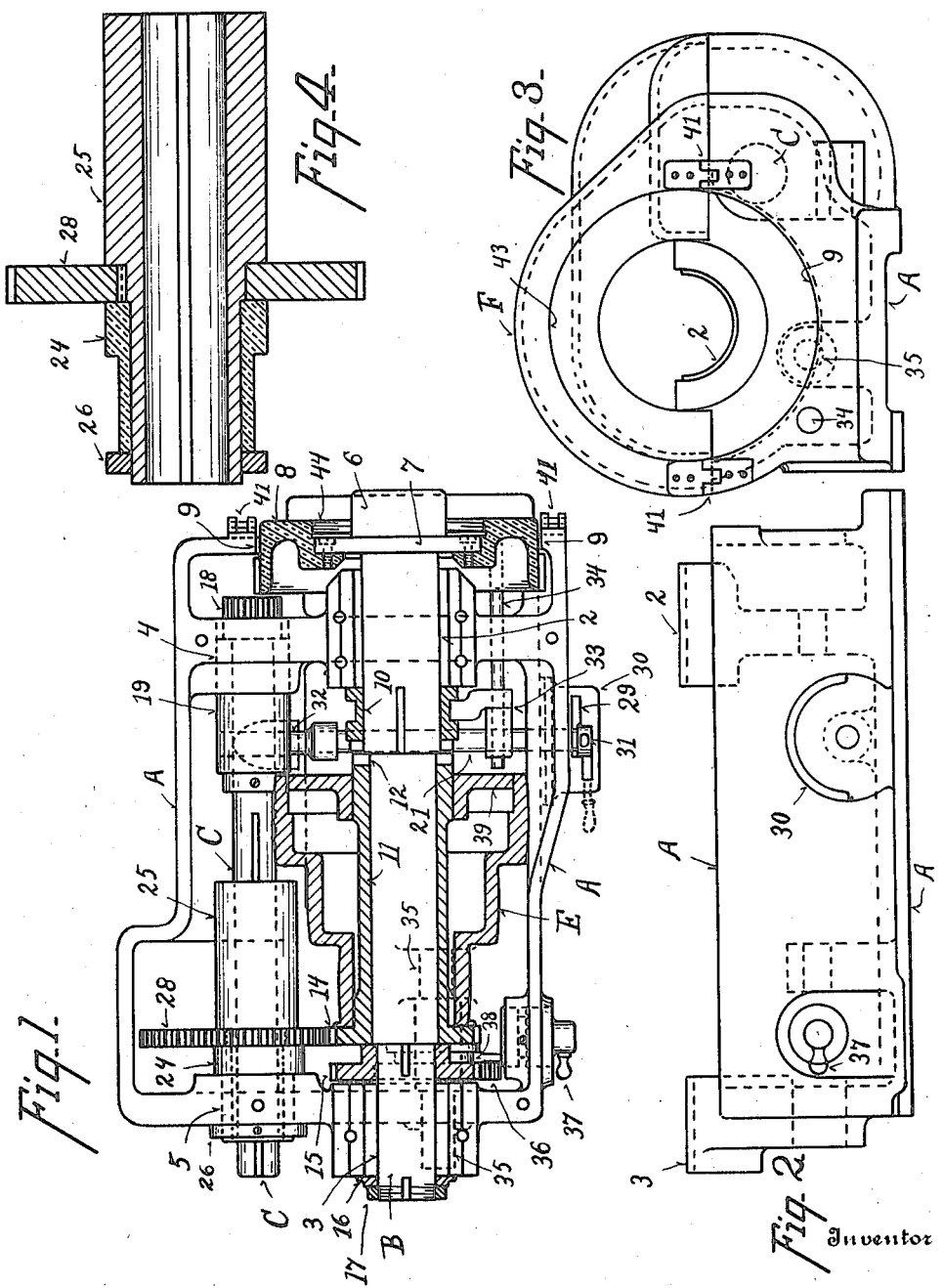
Witnesses
Inventor
William L. Schellenbach
By C. W. Miles
Attorney

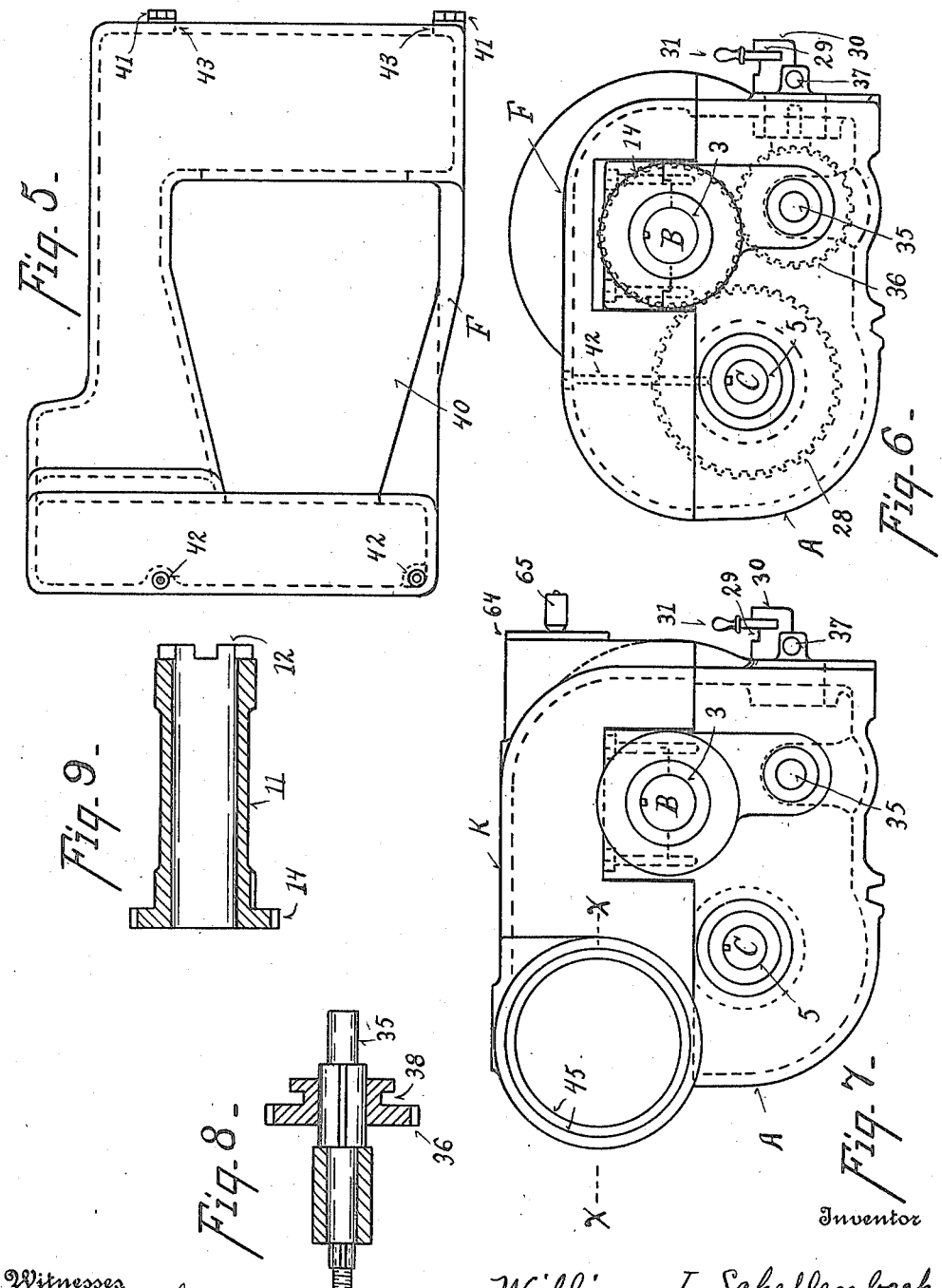

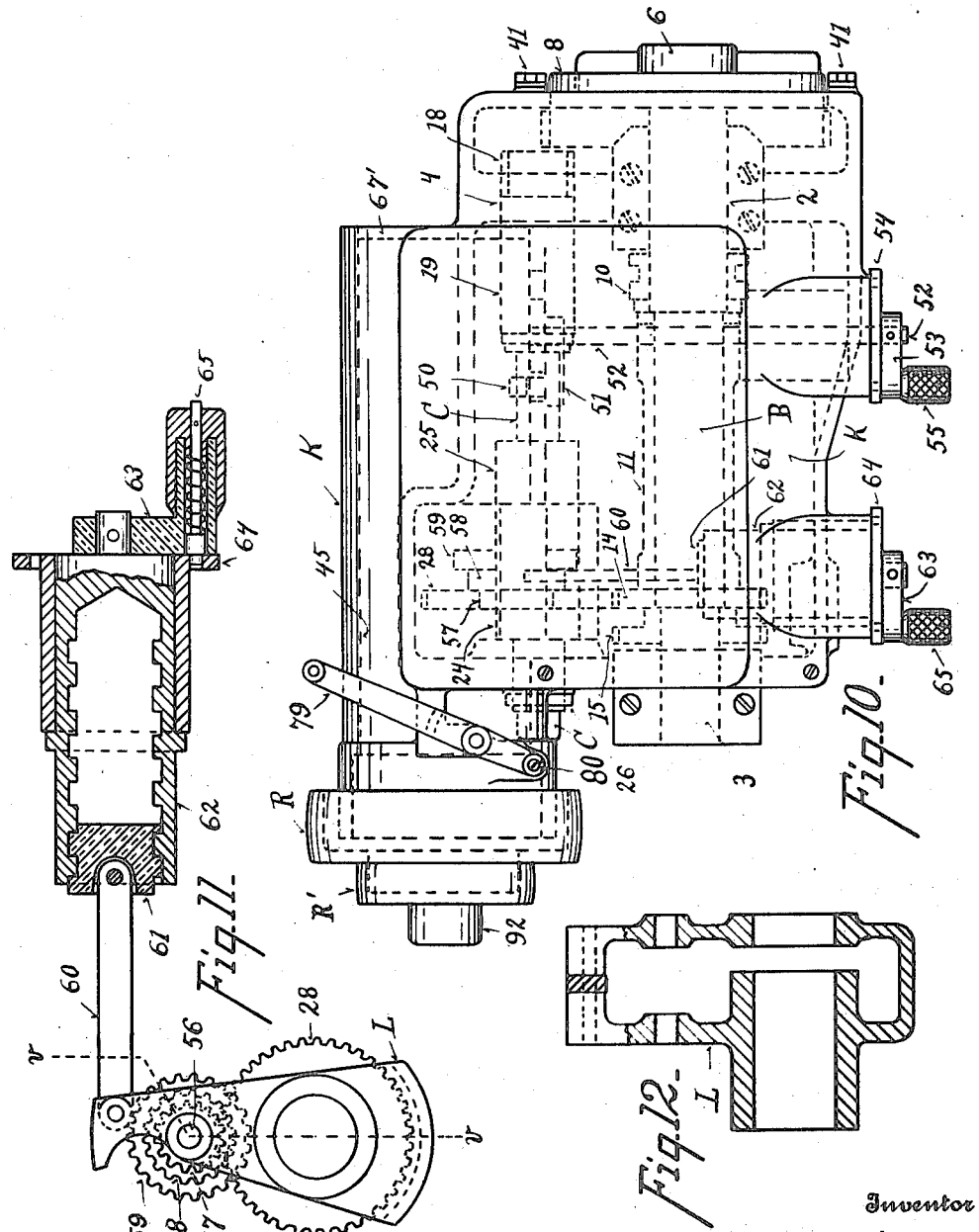

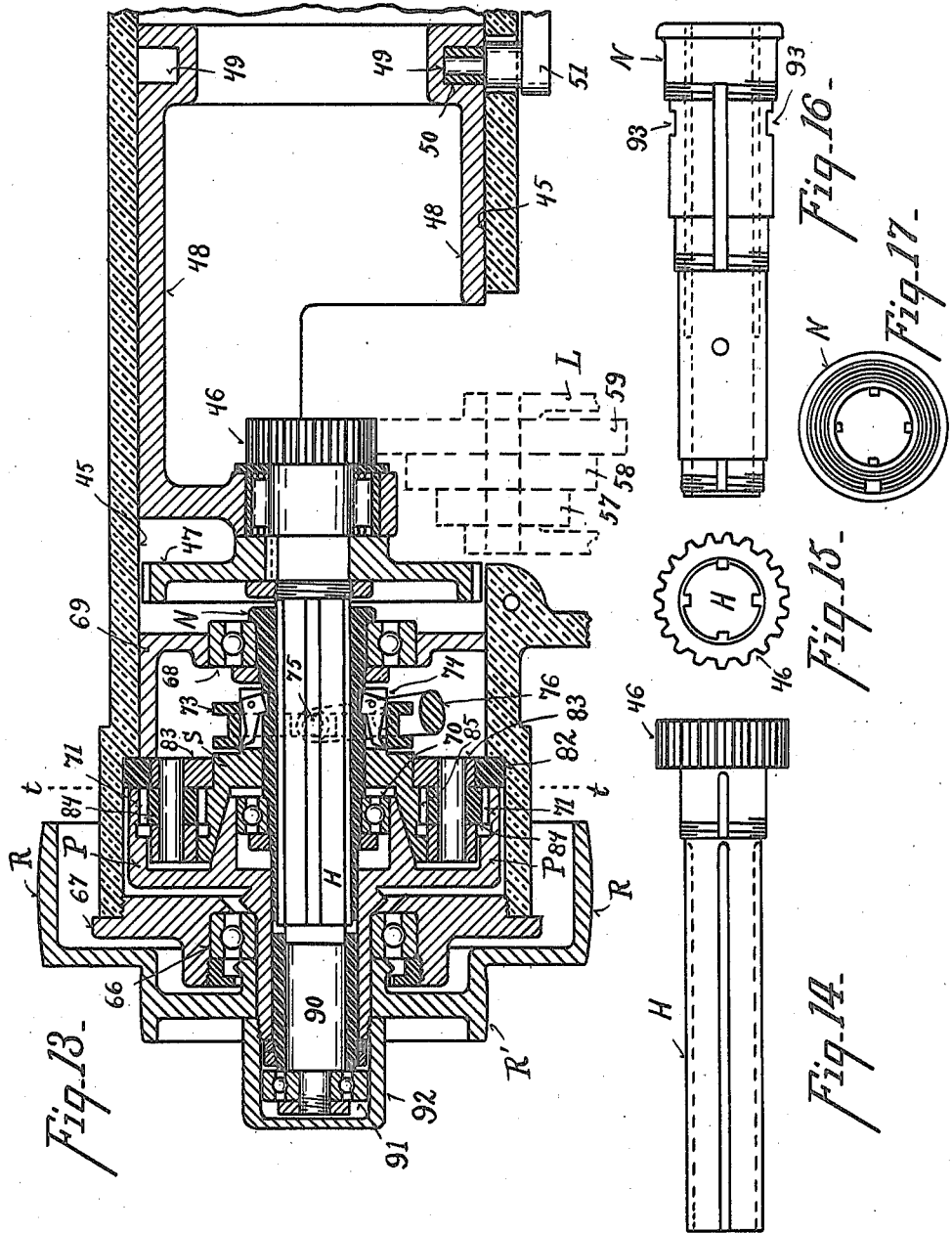

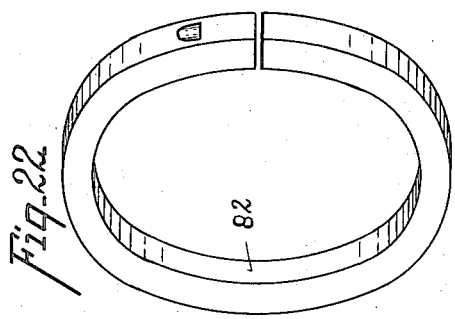
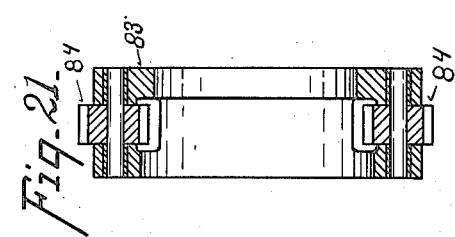
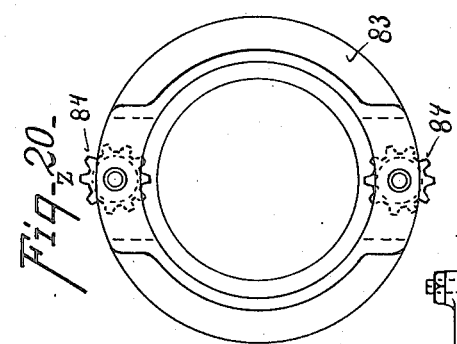
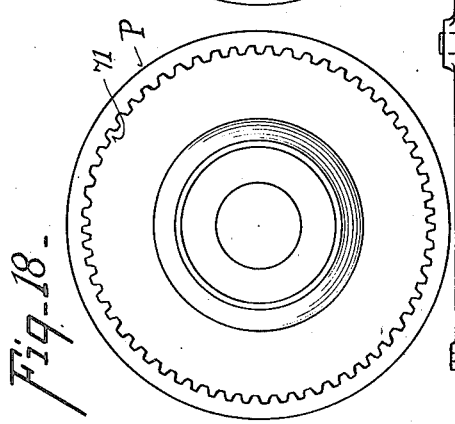
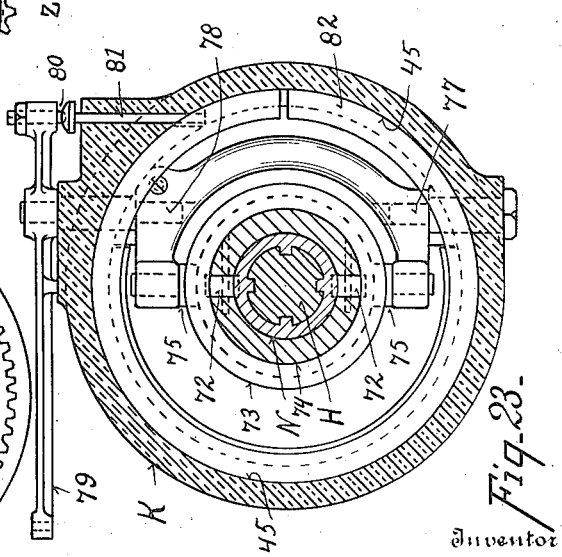

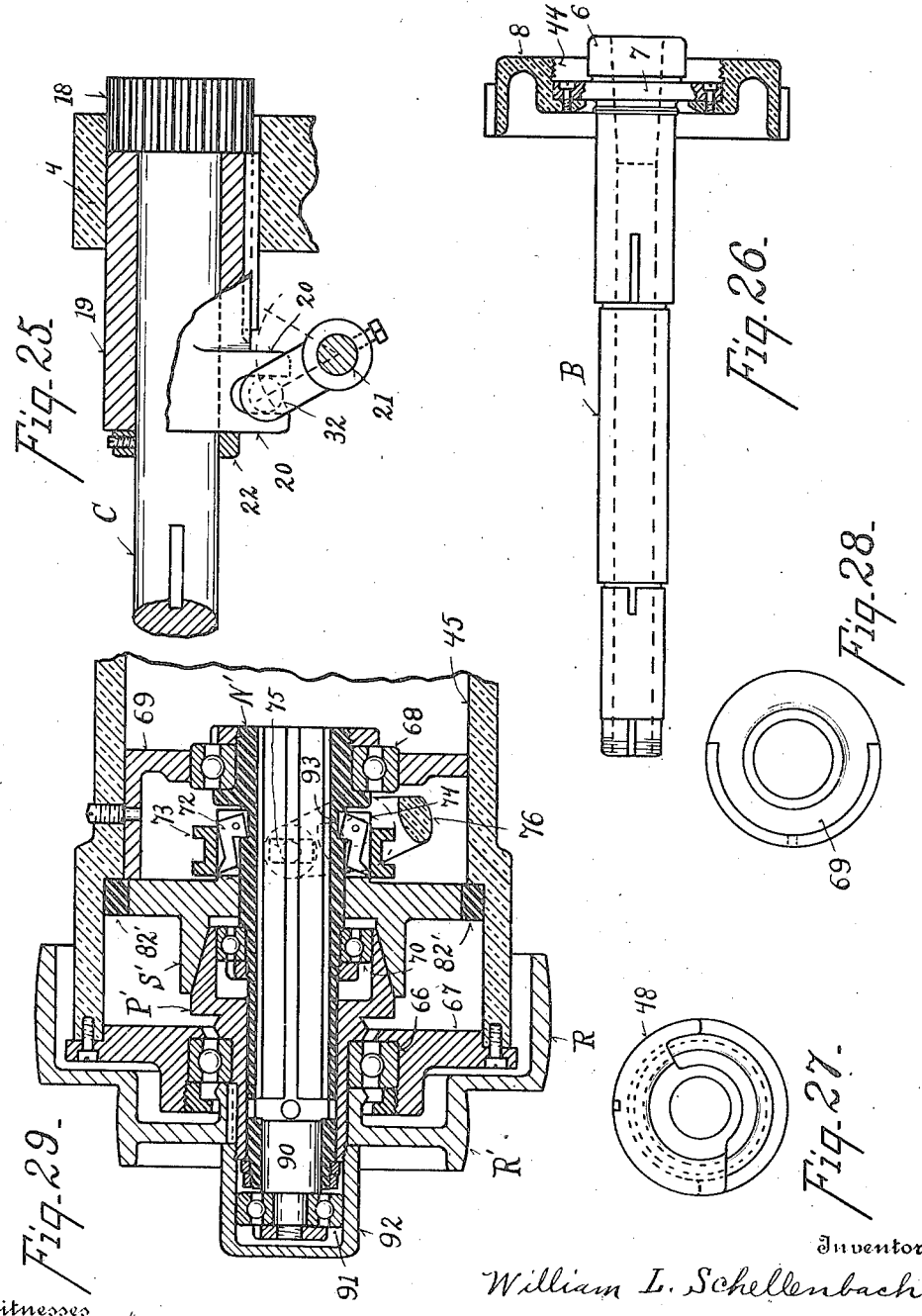

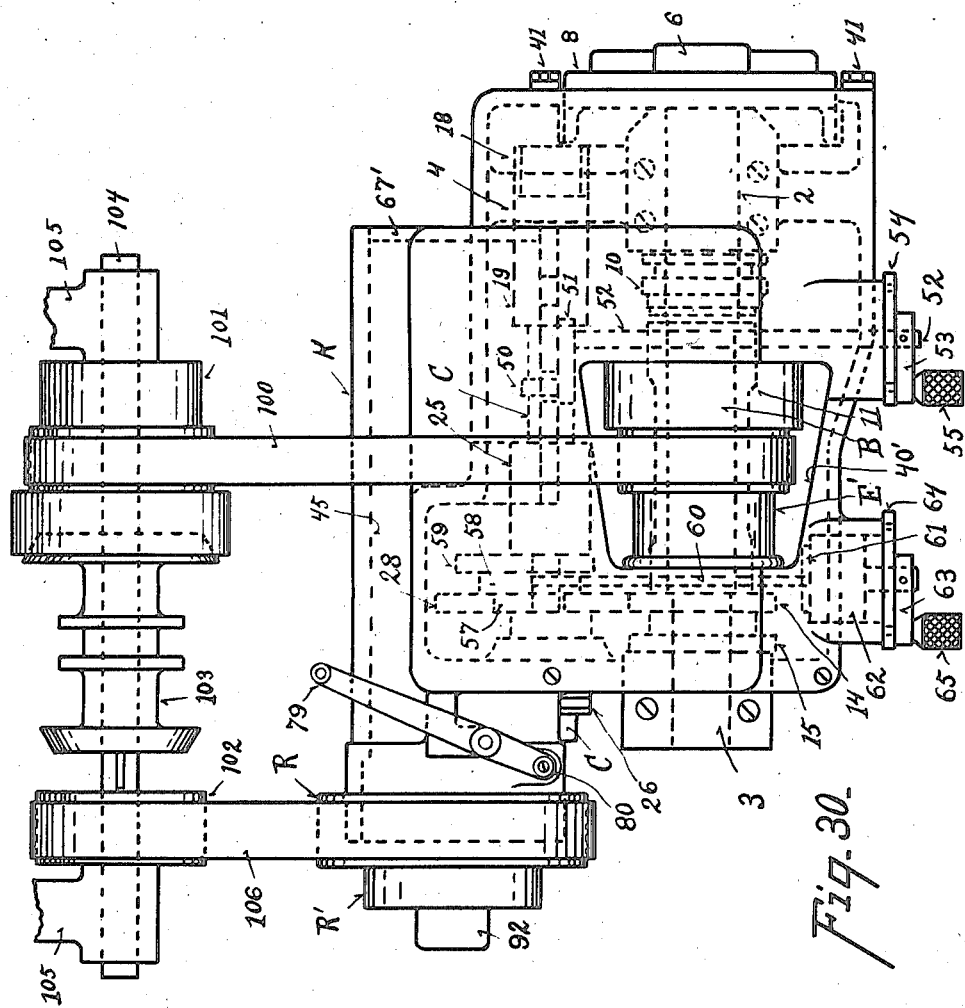

UNITED STATES PATENT OFFICE.

WILLIAM L. SCHELLENBACH, OF WYOMING, OHIO.

LATHE.

1,196,593.      Specification of Letters Patent.      Patented Aug. 29, 1916.

Application filed March 4, 1916. Serial No. 82,243.

*To all whom it may concern:*

Be it known that I, WILLIAM L. SCHELLENBACH, a citizen of the United States, residing at Wyoming, in the county of Hamilton and State of Ohio, have invented certain new and useful Improvements in Lathes, of which the following is a specification.

My invention relates to improvements in engine lathes.

One of its objects is to provide an improved arrangement of driving parts whereby the lathe is readily convertible from a direct belt driven lathe to a geared lathe.

Another object is to provide a lathe adapted to be employed either as a simple directly belt driven lathe, or as a more complicated geared lathe, and in which the head stock, spindle and back gear shaft are common to both types and may be employed with slight change to constitute a lathe of either type, or to enable the lathe of either type to be converted to the other as desired.

Another object is to provide a lathe of relatively less parts and capable of taking the place of what has heretofore constituted two separate and distinct types of lathe.

Another object is to provide an improved arrangement of driving mechanism whereby power is first subjected to the control of clutch, reverse, and speed changing mechanism and then transmitted to a back gear shaft and from the back gear shaft to the spindle at two or more different speeds.

Another object is to provide in combination with a head-stock spindle feed shaft and back gear shaft two interchangeable headstock covers, one of which is provided with power controlling and speed changing mechanism whereby the substitution of one cap for the other serves to convert the lathe from one type to another.

Another object is to provide in combination with a head stock, spindle, feed shaft, and back gear shaft a detachable cover carrying power controlling mechanism to stop, start, reverse, and vary the speed of the spindle when said cover is in position, and to enable the spindle to be directly belt driven when said cover is detached.

Another object is to provide an improved arrangement of head stock, spindle, feed shaft and back gear shaft.

My invention also comprises certain details of form, combination and arrangement all of which will be fully set forth in the description of the accompanying drawings in which:

Figure 1. is a top plan view, partly in section of the headstock of my improved lathe fitted up to be driven directly by a cone pulley on the lathe spindle and with the headstock cover removed. Fig. 2. is a side elevation of the headstock with the spindle and cover detached. Fig. 3. is a forward end view of the headstock of Fig. 1, with cover in position. Fig. 4 is a sectional detail of one of the back gear shaft sleeves detached. Fig. 5 is a top plan view of the cover of Fig. 3 detached. Fig. 6 is a rear end view of the headstock and cover of Figs. 1 to 3. Fig. 7 is a rear end view of the headstock with a different cover to that of Figs. 3 and 6 in position thereon. Fig. 8 is a sectional detail of the feed shaft and gear detached. Fig. 9 is a central longitudinal section of the spindle sleeve detached. Fig. 10 is a top plan view of the headstock and cover of Fig. 7. Fig. 11 is a side elevation of the rocker arm carried by the back gear shaft and providing for speed changes between the geared spindle and the back gear shaft, and means to rock the same. Fig. 12 is a sectional view on line $v\ v$ of Fig. 11 Fig. 13 is a sectional detail of the geared spindle and its driving clutch, reverse and gear shifting mechanism, taken on line $x\ x$ of Fig. 7. Fig. 14 is a side elevation of the sliding geared spindle. Fig. 15 is an end view of the same. Fig. 16 is a side elevation, detached, of the sleeve in which the geared spindle Fig. 14 slides. Fig. 17 is an end view of the same on a slightly enlarged scale. Fig. 18 is a view of the larger geared spindle clutch member detached. Fig. 19 is a view of the smaller geared spindle clutch member detached. Fig. 20 is a view of the cage carrying the planetary gears meshing with the clutch members Figs. 18 and 19. Fig. 21 is a sectional detail on line $z\ z$ of Fig. 20. Fig. 22 is a perspective view of the split clutch ring to lock the cage of Fig. 20 against rotation. Fig. 23 is a sectional detail on line $t\ t$ of Fig. 13. Fig. 24 is a perspective view of a clutch shifting dog detached. Fig. 25 is a sectional detail of a portion of the back gear shaft and its shifting mechanism. Fig. 26 is a view of the spindle and face gear detached. Fig. 27 is an end view of the geared driving spindle shifting cage detached. Fig. 28 is a view of one of the geared driving spindle sleeve bearings detached. Fig. 29 is a view similar to Fig. 13 illustrating a modification thereof. Fig. 30 is a plan view of a modification in which both the cone pulley and geared head are illustrated in position to be alternately selectively driven from a countershaft.

The accompanying drawings represent the preferred embodiments of my invention, in which A represents the main frame or base of the headstock, which is closed at the bottom and sides to form an oil well or container, and a forward compartment housing the face gear. The headstock is provided with a forward bearing 2 and a rear bearing 3 for the lathe spindle B and a forward bearing 4 and rear bearing 5 for the back gear shaft C. The spindle B forward of the forward bearing 2 has a nose 6 which serves as a guide for chucks and work and has a tapered bore to receive the usual detachable live center, and an annular integral flange 7 to which is rigidly secured the face gear 8. The face gear 8 has its teeth housed within the forward compartment of the headstock to protect them from metal chips and dirt, and the periphery of the wheel 8 forward of said gear teeth makes a close or dirt tight joint with the adjacent semi-annular face 9 of the frame A. The support for the bearings 2 and 4 forms a partition to divide the headstock into two compartments and to retain the oil in rear of said partition.

Mounted on the spindle B between its bearings are a sliding clutch member 10 splined to the spindle, a sleeve 11 loosely journaled on the spindle and provided with clutch teeth 12 to engage the clutch teeth of the clutch member 10, and a gear 14 rigidly mounted on the rear end of the sleeve 11. A gear 15 of the same diameter and pitch as the gear 14 is keyed to the spindle B in rear of and spaced from the gear 14. A thrust collar is interposed between the gear 15 and the rear spindle bearing 3 and a collar 16 and lock nut 17 outside of the rear bearing 3 prevent excessive endwise movement of spindle B.

The back-gear shaft C is movable endwise in its bearings and is provided at its forward end with a pinion 18 to mesh with the gear wheel 8 on the spindle B. The forward bearing 4 of the back gear shaft is of larger bore than the back gear shaft, and a sleeve 19 is mounted loosely on the back gear shaft and splined in the bearing 4. Said sleeve has downwardly projecting ears 20 to be engaged by a crank pin 32 on a shifting rod or shaft 21 to move the sleeve 19 and back gear shaft endwise. A collar 22 holds the sleeve 19 in place endwise relative to the back gear shaft.

At the rear end of the back gear shaft is a sleeve 25 through which the back gear shaft slides endwise and to which it is splined so that the sleeve 25 rotates with the back gear shaft. The sleeve 25 has a bushing 24 which is journaled in the bearing 5 and held against endwise movement by a collar 26. On the sleeve 25 is rigidly mounted a gear 28 which meshes with the gear 14 on the sleeve 11.

The shifting rod 21 is journaled at opposite ends in the head stock A and has a limited movement endwise, and a limited rocking or rotary movement which are controlled by means of an irregular slot 29 in a dial plate 30 through which slot projects a crank arm 31 carrying an operating handle. The endwise movement of rod 21 serves to engage and disengage a crank pin 32 carried thereby with the recess between the ears 20 of sleeve 19 while the rocking movement of the rod 21 with its operating lever 31 in the right hand portion of slot 29 serves to shift the back gear shaft in either direction endwise. When the operating lever is in the left hand portion of the slot 29 the pin 32 is out of engagement with ears 20 and a pinion on the rod 21 meshes with a rack bar on the shifting lever 33 which engages the annular groove of clutch member 10 to shift said clutch member into or out of engagement with the sleeve 11. The shifting lever 33 slides endwise on a stud shaft 34. The endwise movement of rod 21 insures the clutch member 10 and back gear shaft maintaining proper relative positions, and prevents interference and injury to the lathe by careless operators. A feed shaft 35 is journaled in bearings in the headstock below the spindle B and is adapted to drive a train of gears to transmit a power feed to the tool carriage. Splined upon the shaft 35 is a gear 36 which is adjustable endwise on shaft 35 so as to mesh either with the gear 14 on the sleeve 11 or with the gear 15 on the spindle B, or to occupy an intermediate position out of engagement with either of said gears. An operating lever 37 having an eccentric pin to engage the annular recess 38 in the hub of gear 36 enables said gear to be shifted from one position to another, and indicates its position.

Where a simple and inexpensive type of lathe is desired in which the spindle B is directly driven by belt, a cone pulley E is detachably secured rigidly upon the sleeve 11, and its forward end supported by means of a detachable disk or hub 39. When so employed a headstock cover F is preferably employed serving as a housing and protection for the gears and having a central opening 40 for the belt to reach the cone pulley E. Said cap is preferably attached to the headstock A by means of separable hinges 41 at the forward edge and bolts 42 at the rear, and is arranged with a semiannular face 43 to closely fit about the upper portion of gear 8 to prevent the entrance of chips or dirt. Face plates or chucks are attached directly to the gear 8 by means of the internal threads 44.

When the spindle is directly driven by belt as above the lathe would be fitted to cut a moderate range of threads and to accurately perform a considerable range of ordinary and heavy lathe work, and having few and simple parts could be produced and marketed at a relatively low figure. Also oil could not be employed in quantity in the oil well.

Where it is desired to have a wide range of tool carriage feeds to cut threads of wide range, and to perform both light and heavy work with accuracy and to run the operative parts in oil furnished by a splash system I provide an additional shaft or spindle H having change gears to secure a wider range of speeds with both forward and reverse feeds, and the spindle H is preferably mounted and journaled in a detachable cover K which is interchangeable in position on the headstock A with the cover F, with provision to transmit motion from the spindle H to the back gear shaft C and thereby convert the simple directly belt driven lathe into a more complicated geared head lathe at any time desired by the simple operation of substituting one cover for another on the headstock, and with the cone pulley in place or detached as desired. I am thus further enabled to provide a lathe of the maximum requirements with a material saving in the number of parts or units required in its production, and also to use duplicate parts for the major portion of both the simple and complex type of lathe, and to enable conversion from one to the other to be readily made at any time.

In Fig. 30 I have illustrated a geared head similar to that of Figs. 7, 10, and 13 in which is provided an opening 40' corresponding to the opening 40 in the head Fig. 5, and a cone pulley E' similar to that illustrated as E in Fig. 1. A countershaft 104 is supported in hangers 105 and provided with a cone pulley 101 opposite the cone pulley E' from which the pulley E' may be driven by a belt 100, preferably in either direction. A pulley 102 is also provided on the shaft 104 opposite the pulley R of the geared head to drive the pulley R by means of a belt 106. A sliding clutch member 103 splined to shaft 104 and operated by a shifting lever, not shown, serves to selectively connect either pulley 101 or 102 in driving relation with the shaft 104, and at an intermediate position to disconnect both of said pulleys from shaft 104. This enables the lathe spindle to be driven as desired either through the belt 100 and cone pulley E', or through the belt 102 and pulley R.

In Fig. 10 is illustrated the general relative position of the parts when the cover K is in position on the headstock A, and in Fig. 13 is illustrated in central horizontal section the assembled mechanism mounted upon spindle H to transmit motion thereto and therefrom, and to control the movements thereof. The spindle H is mounted axially in a tubular recess 45 in the cover K and is provided with a pinion 46 and a gear 47 of larger diameter both rigid on spindle H. The spindle H is journaled at a point between the gears 46 and 47 to a cylindrical cage 48 which slides endwise in the tube 45 and is adjustable therein by means of an annular groove 49 at one end of the cage 48 which groove is engaged by a roller 50 carried by a crank pin on a crank arm 51 mounted on a rock shaft 52. The opposite end of the shaft 52 projects through the front of the cover K and is provided with a crank arm 53 to sweep over the face of a dial plate 54 and is provided with a spring latch pin 55 to lock the crank arm 53 to several say six different positions on the dial plate, thereby enabling the spindle H to be shifted endwise and locked at six different positions which serves to shift the pinion 46 through a series of three operative positions and then to shift the gear 47 successively through the same operative positions.

A rocking segment L is loosely journaled upon the sleeve 25 and its bushing 24 upon opposite sides of the gear 28 so as to have a limited movement concentrically about the axis of the back gear shaft. The segment L is also provided with a shaft 56 upon which are loosely journaled a series say three gears 57, 58 and 59 of different diameters, which gears are all locked together and move in unison, the gear 57 being in mesh with the gear 28 on the back gear shaft. The segment L is attached pivotally by means of a link 60 to a nut 61 having a coarse pitch thread which is threaded into a socket in a thimble or cap 62 which is journaled in a recess in the front of the cover K. A crank arm 63 is attached to the thimble 62 so as to turn therewith and to sweep over the face of a dial plate 64 and a spring latch pin 65 enables the thimble 62 to be locked to a series say six or more different positions each of which indicates a different position for the gears 57, 58, 59 circumferentially about the axis of the back gear shaft, and each of these positions brings one of the gears 57, 58, 59 into position to mesh with one or other of the gears 46 and 47 and serves to transmit power from the spindle H at a variety of different rates of speed to the back gear shaft and thence to the lathe spindle either directly or through its clutch sleeve.

The tubular recess 45 has a stationary cap 67 at one end and a stationary cap 67' at the opposite end. N represents a sleeve which is splined to the spindle H and is mounted at one end in a roller bearing 68 carried by the stationary bearing member 69 supported by the walls of recess 45. At the opposite end sleeve N has a plug 90 the outer end of which is journaled in a roller bearing 91 mounted in the cap 92. A clutch member P is loosely journaled over a portion of the sleeve N and is supported by a roller bearing 66 carried by the stationary cap 67. A roller bearing 70 is also interposed between the inner end of the clutch member P and the sleeve N. The cap 92 is threaded on to the end of the hub of clutch member P. Thus the clutch member P is journaled with reference to the cover K by the roller bearing 66 and in turn is supported internally by the roller bearings 70 and 91 with reference to the sleeve N which steadies clutch P against irregular movement upon its axis and furnishes a journal for sleeve N without necessity of actual contact between said sleeve and the hub of clutch P which at times travel in the opposite directions. A belt pulley R driven at uniform speed is mounted on and drives the clutch member P. A belt pulley R' may be employed to drive a circulating pump.

A clutch member S is keyed to and slides endwise on the sleeve N, being shifted thereon endwise to engage and disengage the clutch member P by means of dogs 72 let into slots in the hub 74 of clutch member S and pivoted thereto, said dogs engaging slots 93 in the sleeve N by means of which clutch member S is thrust endwise thereon. A collar or ring 73 slides on the hub 74 to engage and actuate the dogs 72, said collar 73 having an annular groove engaged by studs 75 carried by a forked lever 76 which is pivotally supported upon studs 77 and 78 passing through the walls of the tubular recess 45. The stud shaft 78 carries outside of the cap K a lever 79 one end of which is connected to a shifting lever and the opposite end is provided with a stud 80 which at one position of lever 79 engages the head of a push pin 81 seated in a recess in the cap K and forces said push pin inwardly thereby causing its inner end to engage and close or lock a split ring 82. A gear cage 83 is journaled upon the periphery of the clutch member S and has journaled therein a plurality of pinions 84 which mesh with the internal gear 71 of clutch member P and also with the external gear 85 of the clutch member S causing said pinions 84 to serve as planetary gears and to travel with the cage 83 about the clutch member S when the cage 83 is not locked against rotation. The split ring 82 normally loosely encircles the periphery of cage 83, but when engaged by the push pin 81, the ring 82 closes upon and locks the cage 83 against rotation, thereby causing the pinions 84 to rotate upon fixed axles instead of rotating axles and thereby transmitting power from the clutch member P to clutch member S in the reverse direction to that when cage 83 is loose. When the clutch members P and S are forced together by the dogs 72 the pinions 84 cease to rotate and the clutch members P and S rotate together at one speed, thereby securing another rate of speed forward for the spindle H.

In the modification Fig. 29, the cage 83 and planetary gears 84 are omitted and otherwise the clutch members P' and S' are mounted and operated as heretofore described, the split ring 82' being mounted upon and adapted to close upon the periphery of the clutch member S' and to act as a brake to stop the rotation of the driving spindle H, and its sleeve N'.

The relative diameters of the gears 46 and 47, and 57, 58 and 59 may be variously combined, but they are capable of and yield particularly desirable ranges of speed when the larger gears are of diameters representing respectively the second and third powers of the smaller gear.

The mechanism herein illustrated and described is capable of considerable modification without departing from the principle of my invention.

Having described my invention, what I claim is:

1. In a lathe a rotatably mounted lathe spindle, a rotatably mounted sleeve encircling a portion of said spindle, means to clutch said sleeve and spindle together a back gear shaft, mechanism to drive said back gear shaft through said sleeve, mechanism to drive said sleeve from said back gear shaft, mechanism to drive said spindle from said back gear shaft, a driving spindle and mechanism to drive said back gear shaft from said driving spindle.

2. In a lathe a rotatably mounted lathe spindle, a rotatably mounted sleeve encircling a portion of said spindle, means to clutch said sleeve to said spindle, a back gear shaft, mechanism to drive said back gear shaft through said sleeve, mechanism to drive said sleeve from said back gear shaft, mechanism to drive said spindle from said back gear shaft, a driving spindle, and mechanism to drive said back gear shaft at relatively different rates of speed from said driving spindle.

3. In a lathe a rotatably mounted lathe spindle, a rotatably mounted sleeve encircling a portion of said spindle, a back gear shaft, mechanism connecting said back gear shaft and sleeve in driving relation, mechanism to connect said back gear shaft and spindle in driving relation, and means to be selectively employed to drive said back gear shaft from said sleeve and to drive said sleeve through said back gear shaft.

4. In a lathe a rotatably mounted lathe spindle, a rotatably mounted sleeve encircling a portion of said spindle, a back gear shaft, mechanism connecting said back gear shaft and sleeve in driving relation, mechanism connecting said back gear shaft and spindle in driving relation, mechanism to be selectively employed to drive said back gear shaft from said sleeve and to drive said sleeve through said back gear shaft, a feed shaft, and mechanism to selectively connect said feed shaft in driving relation with said sleeve or in driving relation with said spindle.

5. In a lathe a rotatably mounted lathe spindle, a rotatably mounted sleeve encircling a portion of said spindle, means to clutch said sleeve to said spindle, a back gear shaft rotatably mounted and adjustable endwise to engage it with and disengage it from driving relation with said spindle, a sleeve telescopically connected to and rotatable with said back gear shaft, mechanism to engage said back gear shaft sleeve in driving relation with said spindle sleeve, a driving spindle, and mechanism carried rotatably upon said back gear shaft sleeve to selectively establish driving relations between said driving spindle and said back gear shaft.

6. In a lathe a headstock, a lathe spindle journaled in said headstock, and a plurality of initial belt driven elements to be interchangeably employed to drive said spindle in the same direction.

7. In a lathe a headstock, a spindle journaled therein, a sleeve encircling a portion of said spindle, a clutch to engage said sleeve with said spindle, a back gear shaft, mechanism to connect said back gear shaft and spindle in driving relation, mechanism to connect said back gear shaft and sleeve in driving relation, and means to be selectively employed to drive said back gear shaft through said sleeve and to drive said sleeve through said back gear shaft.

8. In a lathe an elemental headstock unit having a spindle journaled therein, a gear loosely mounted concentrically with said spindle, means to clutch said gear to said spindle, a gear carried rigidly by said spindle, a back gear shaft journaled in said headstock and provided with a pinion to engage said fixed gear on the spindle, means to connect said back gear shaft and loosely mounted spindle gear in driving relation, a sleeve to which said back gear shaft is splined, a gear mounted upon said back gear sleeve, and means to drive said back gear and spindle through the gear on said back gear sleeve.

9. In a lathe a headstock, a lathe spindle journaled in said headstock, a back-gear shaft journaled in said headstock, and a plurality of initial belt driven elements to be interchangeably employed to drive said spindle and back-gear shaft in the same direction.

10. In a lathe a headstock, a lathe spindle journaled in said headstock, a rotatably mounted sleeve encircling a portion of said spindle, means to clutch said sleeve to said spindle, a back-gear shaft journaled in said headstock, mechanism to connect said back-gear shaft and sleeve in driving relation, mechanism adjustable to connect said back-gear shaft and spindle in driving relation, and a plurality of primary driving members to be interchangeably employed to drive said spindle and back-gear shaft.

11. In a lathe a headstock, a lathe spindle journaled therein, means for transmitting power at variable speed to said spindle through a belt traveling at variable speed, and independent means to transmit a plurality of speeds to said spindle in the same direction from a belt traveling at a fixed speed.

12. In a lathe a headstock, a spindle journaled therein, a loosely mounted sleeve gear encircling said spindle, and adapted to constitute alternately a driving element and a driven element, means to clutch said sleeve gear to said spindle, a face gear fixed on said spindle, a back gear shaft carrying a pinion to alternately engage and disengage said face gear, means to engage and disengage said pinion from the face gear and means to engage and disengage said sleeve gear with said spindle.

13. In a lathe a rotatably mounted lathe spindle, a rotatably mounted sleeve encircling a portion of said spindle, means to clutch said sleeve to said spindle, a back gear shaft, mechanism to drive said sleeve from said back gear shaft, mechanism to drive said spindle from said back gear shaft, a driving spindle, mechanism to drive said back gear shaft from said driving spindle, and means to selectively reverse the direction of rotation of said driving spindle.

14. In a lathe a headstock, a spindle journaled therein, a sleeve gear encircling a portion of said spindle and adapted to be clutched to said spindle, a back gear shaft, means enabling said sleeve gear to act as the driving element for said back gear shaft and spindle, and an independent driving means wherein said sleeve gear performs the function of a driven element.

15. In a lathe, a headstock, a spindle journaled therein, a loosely mounted sleeve gear encircling a portion of said spindle and fitted to receive a plurality of belt pulleys, means to clutch said sleeve gear to said spindle, a gear rigidly mounted on said spindle, a back gear shaft having a pinion to engage and disengage the fixed gear on said spindle, a sleeve splined to said back gear shaft and provided with a back gear to mesh with said sleeve gear, a rocker arm journaled upon said back gear sleeve and provided with a cone of gears one of which meshes with said back gear, a headstock cover plate, a plurality of sliding gears mounted in said cover plate, and means to engage said sliding gears with said cone gears.

16. In a lathe a headstock, a spindle journaled therein, a fixed gear on said spindle, a loosely journaled gear on said spindle means to clutch said loosely journaled gear to said spindle, a back gear pinion to engage said spindle fixed gear, a gear driving said back gear pinion and meshing with said loosely journaled gear, and two interchangeable headstock cover plates, one having an opening for the admission of a driving belt to the interior of said headstock and the other cover plate being closed and provided with a variable speed element to transmit motion from its exterior to said spindle.

17. In a lathe a headstock, a lathe spindle journaled therein, a cone pulley journaled on said spindle, a headstock cover having an opening to admit a driving belt to said cone pulley, and a closed headstock cover interchangeable with said open headstock cover, said closed headstock cover being provided with means for transmitting power from the exterior thereof at variable speed to said spindle when said closed headstock cover is in place on the headstock.

18. In a lathe, a headstock having a chamber constituting an oil container, a lathe spindle journaled in said headstock, a loosely journaled sleeve gear encircling a portion of said spindle, and adapted to receive a step driving pulley, a gear rigidly mounted on said spindle, a back gear shaft having a pinion to engage said fixed spindle gear, and a back gear meshing with said sleeve gear, means to clutch said sleeve gear to the spindle, a headstock cover having an opening to admit a driving gear to the pulley on said sleeve gear, and a closed headstock cover interchangeable with said open headstock cover, a variable speed driving element mounted in said closed headstock cover to transmit motion from the exterior thereof to said spindle and back gear shaft, said closed headstock cover forming with said headstock a closed oil container within which the operative parts may be lubricated by a splash system of lubrication.

19. In a lathe a headstock, a lathe spindle journaled therein, a fixed gear on said spindle, a loosely journaled sleeve gear encircling a portion of said spindle, means to clutch said sleeve gear to said spindle, a back gear shaft having a pinion to engage said fixed spindle gear and a back gear in mesh with said sleeve gear, a detachable headstock cover, a variable speed driving element mounted in said headstock cover and detachable therewith to transmit power at variable speed from the exterior thereof to said spindle and back gear shaft, means carried by said headstock cover to change the speed of said variable speed element, and means carried by said headstock cover to engage and disengage said variable speed element in driving relation with the lathe spindle.

20. In a lathe a headstock, a lathe spindle journaled therein, a fixed gear on said spindle, a loosely journaled sleeve gear encircling a portion of said spindle, means to clutch said sleeve gear to said spindle, a back gear shaft having a pinion to engage said fixed spindle gear and a back gear in mesh with said sleeve gear, a detachable headstock cover a reversible variable speed driving element mounted in said headstock cover and detachable therewith to transmit power at variable speed from the exterior thereof to said spindle and back gear shaft, means carried by said headstock cover to change the rate of speed of the spindle, and means carried by said headstock cover to reverse the direction of rotation of said spindle.

21. In a lathe, a headstock open at the top and closed at the sides and bottom divided by a partition into an oil containing compartment and a face gear housing compartment, a lathe spindle journaled therein, a face gear rigidly mounted on said spindle and closing an opening in said housing compartment with its gear teeth within said housing compartment, a loosely journaled sleeve gear encircling a portion of said spindle, means to clutch said gear sleeve to said spindle, a feed shaft journaled in said headstock and provided with means to selectively connect it in driving relation with said spindle and said sleeve gear, a back gear shaft provided with a pinion to engage said face gear and adjustable endwise into and out of engagement therewith a back gear in mesh with said sleeve gear and mounted upon a sleeve splined to said back gear shaft, and shifting mechanism having a position in operative relation with said spindle clutch and out of operative relation with the back gear shaft to shift said spindle clutch, and another position in operative relation with said back gear shaft and out of operative relation with said spindle clutch to shift said back gear shaft, and a cover plate fitted over the open top of said headstock and completing the protective housing for said spindle face gear.

22. In a lathe a headstock, a spindle journaled therein, a cone pulley journaled on said spindle, back gear mechanism, means to engage and disengage said back gear mechanism to drive said spindle from said cone pulley, and means to selectively drive said spindle at variable speed and in either direction independently of said cone pulley.

23. In a lathe a headstock, a lathe spindle journaled therein, a headstock cover, mechanism contained within said headstock and cover providing a plurality of means to selectively drive said lathe spindle.

24. In a lathe a headstock, a lathe spindle journaled therein, means contained within said headstock to selectively drive said spindle by belt traveling at variable speed or by belt traveling at constant speed in the same direction.

25. In a lathe a headstock, a spindle journaled therein, a sleeve journaled on said spindle and adapted to be directly driven at variable speed by a belt to drive said spindle means to clutch said sleeve to said spindle, and independent means adapted to be selectively employed to drive said spindle.

In testimony whereof I have affixed my signature in the presence of two witnesses.

WILLIAM L. SCHELLENBACH.

Witnesses:
 C. W. MILES,
 W. THORNTON BOGERT.